United States Patent
Callewaert

(10) Patent No.: US 11,603,065 B2
(45) Date of Patent: Mar. 14, 2023

(54) AIRBAG HANGER TABS AND RELATED ASSEMBLY METHODS

(71) Applicant: Autoliv ASP, Inc., Ogden, UT (US)

(72) Inventor: Doug Callewaert, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 344 days.

(21) Appl. No.: 16/793,988

(22) Filed: Feb. 18, 2020

(65) Prior Publication Data
US 2021/0253053 A1  Aug. 19, 2021

(51) Int. Cl.
*B60R 21/20* (2011.01)
*B60R 21/232* (2011.01)

(52) U.S. Cl.
CPC ............ *B60R 21/20* (2013.01); *B60R 21/232* (2013.01)

(58) Field of Classification Search
CPC ..... B60R 21/20; B60R 21/232; B60R 21/217; B60R 21/213
See application file for complete search history.

(56) References Cited

U.S. PATENT DOCUMENTS

| | | | | |
|---|---|---|---|---|
| 7,980,585 | B2* | 7/2011 | Cheal | B60R 21/201 280/730.2 |
| 8,056,924 | B2* | 11/2011 | Hatfield | B60R 21/213 280/730.2 |
| 8,091,918 | B2* | 1/2012 | Mitchell | B60R 21/201 280/730.2 |
| 8,136,833 | B2* | 3/2012 | Baumgartner | B60R 21/213 24/458 |
| 8,240,701 | B2* | 8/2012 | Cheal | B60R 21/201 280/730.2 |
| 9,487,175 | B2* | 11/2016 | Noma | B60R 21/214 |
| 9,580,036 | B2* | 2/2017 | Choi | B60R 21/213 |
| 10,005,419 | B2* | 6/2018 | Konaka | B60R 21/237 |
| 10,647,285 | B2* | 5/2020 | Christiansen | B60R 21/232 |
| 11,040,690 | B2* | 6/2021 | Montgomery | B60R 21/232 |
| 11,130,464 | B2* | 9/2021 | Dinsdale | B60R 21/232 |
| 2021/0261087 | A1* | 8/2021 | Wang | B60R 21/232 |

FOREIGN PATENT DOCUMENTS

WO    WO-2014014191 A1 *  1/2014  .......... B60R 21/201

* cited by examiner

*Primary Examiner* — James M Dolak
*Assistant Examiner* — Joselynn Y Sliteris
(74) *Attorney, Agent, or Firm* — Matthew D. Thayne; Thayne and Davis LLC

(57) ABSTRACT

Tabs for coupling airbag cushions to hangers and/or vehicles, along with related assembly/manufacturing methods. In some embodiments, the tab may comprise a first section comprising a first plurality of openings and a slot configured to receive a portion of the hanger therethrough, the slot being positioned in between at least a first opening of the first plurality of openings and a second opening of the first plurality of openings. The tab may further comprise a second section comprising a second plurality of openings. In some embodiments the second section may comprise, at least in part, a narrower width than the first section.

17 Claims, 10 Drawing Sheets

AIRBAG HANGER TABS AND RELATED ASSEMBLY METHODS

SUMMARY

Airbag cushions, such as inflatable curtain airbag cushions, for example, are often mounted to vehicles using hangers. It is known to use tabs to couple the hanger to the cushion and/or cushion module/assembly. Such tabs often pass around or through a portion of the hanger and are then sewn onto the cushion or a portion of the cushion module/assembly. However, known hanger tabs suffer from a number of drawbacks. For example, some tabs are useful to avoid twisting during use but may provide poor performance with off-axis loading scenarios during use. Other tabs provide better performance with off-axis loading but fail to provide adequate anti-twist functionality.

The present inventors have determined that it would be desirable to provide apparatus, systems, and methods that overcome one or more of the foregoing limitations and/or other limitations of the prior art. In some embodiments, the inventive concepts disclosed herein may therefore provide hanger tabs and related methods that provide both anti-twisting functionality, which may allow for avoiding the use of anti-twist rods, extrusions, socks, or the like, and thereby save on costs, and provide improved performance during off-axis loading. In some embodiments, a single piece of unitary material may be used with the scrap. In some embodiments, strength may also be improved vis-à-vis many known hanger tabs, such as by, in some embodiments, providing additional layers of material, which may be provided by increasing the number of folds on the tab during assembly/manufacturing. In some embodiments, the tab may be configured to both extend through a slot formed in the hanger and extend about a head or other similar feature of the hanger.

Various embodiments disclosed herein may also provide other features, such as poka-yoke features and/or features to facilitate sewing through thick and/or layered portions of the tab. For example, holes in the tab may be spaced apart with specific dimensions to ensure consistency in assembly by aligning the holes during folding. Other features may provide for adjacent sections of the tab having differing number of layers, which may facilitate sewing by providing a ramp-like effect from a portion having fewer layers, such as two, to a portion having more layers, such as four.

In a more particular example of an airbag cushion assembly according to some embodiments, the assembly may comprise a curtain airbag module and a hanger configured to mount the curtain airbag module within a vehicle. The hanger may comprise a head and a hanger slot. The assembly may further comprise a tab coupled to the hanger and the curtain airbag module, which tab may comprise a tab slot for receiving the head of the hanger therethrough. The tab may be coupled to the hanger with the head of the hanger extending through the tab slot and with at least a portion of the tab extending through the hanger slot.

In some embodiments, the tab may comprise a plurality of openings. In some such embodiments, two or more openings of the plurality of openings may be aligned.

In some embodiments, the tab may comprise at least a portion having at least four layers. In some such embodiments, the tab may comprise a portion having four layers and another portion having fewer layers, such as only two layers. In some embodiments, each of the at least four layers comprises at least one opening aligned with an opening in each other layer of the at least four layers. Some embodiments may comprise additional aligned openings.

In some embodiments, the tab may comprise a first portion having four layers and a second portion having two layers. In some such embodiments, a stitch may extend through the first portion, the second portion, and at least a portion of the curtain airbag module, such as a portion of the cushion itself.

In some embodiments, the tab may comprise a first section and a second section, wherein the second section may comprise, at least in part, a narrower width than the first section. In some such embodiments, the width of the second section may be less than a length of the hanger slot and/or the width of the first section may be greater than the length of the hanger slot.

In an example of a tab for coupling an airbag cushion to a hanger according to some embodiments, the tab may comprise a first section comprising a first plurality of openings and a slot configured to receive a portion of the hanger therethrough. The slot may be positioned in between at least a first opening of the first plurality of openings and a second opening of the first plurality of openings. The tab may further comprise a second section comprising a second plurality of openings, with the second section comprising, at least in part, a narrower width than the first section. In some embodiments, the second section may comprise a width that is entirely narrower than the first section.

In some embodiments, the tab may be configured to be coupled with the hanger by inserting the portion of the hanger through the slot, aligning at least two openings of the first plurality of openings, and aligning at least one opening of the second plurality of openings with the at least two openings of the first plurality of openings.

In some embodiments, the first section may comprise four or more openings. A first pair of the four or more openings may be configured to be aligned and a second pair of the four or more openings may be configured to be aligned by folding the first section against itself. The second section may also comprise four or more openings. The tab may be configured such that, by folding the second section against the first section, a first pair of the four openings of the second section is configured to be aligned with the first pair of the four openings of the first section and a second pair of the four openings of the second section is configured to be aligned with the second pair of the four openings of the first section.

In some embodiments, the second section may comprise a pair of opposing cutouts. Alternatively, the second section may comprise opposing edges defining the width of the second section therebetween, wherein the opposing edges are at least substantially parallel.

In some embodiments, the first section may comprise a length greater, at least in part, than a length of the second section. In some such embodiments, the first section may comprise a length entirely greater than the second section.

In some embodiments, the slot may comprise an elongated slot and/or one or more of the openings of the first plurality of openings and the second plurality of openings may comprise a circular hole.

In an example of a method for coupling a tab with a hanger for mounting an airbag cushion module according to some implementations, the method may comprise extending a first section of the tab through a slot formed in the hanger; folding a first portion of the first section of the tab against a second portion of the first section of the tab to form a folded region; inserting a portion of the hanger through a tab slot formed in a second section of the tab; and folding at least a portion of the second section of the tab against the folded region to add at least one additional layer to the folded region.

In some implementations, the step of folding at least a portion of the second section of the tab against the folded region may add two additional layers to the folded region such that the folded region comprises four layers.

In some implementations, following the step of folding at least a portion of the second section of the tab against the folded region, the tab may comprise portions having differing numbers of layers, such as, in some implementations, at least a portion comprising at least four layers and a portion comprising fewer layers, such as two layers.

Some implementations may further comprise sewing the tab to a portion of the airbag cushion module, such as the cushion of the module.

In some implementations, the first section of the tab may comprise a plurality of openings. Some such implementations may further comprise aligning at least two openings of the first plurality of openings.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
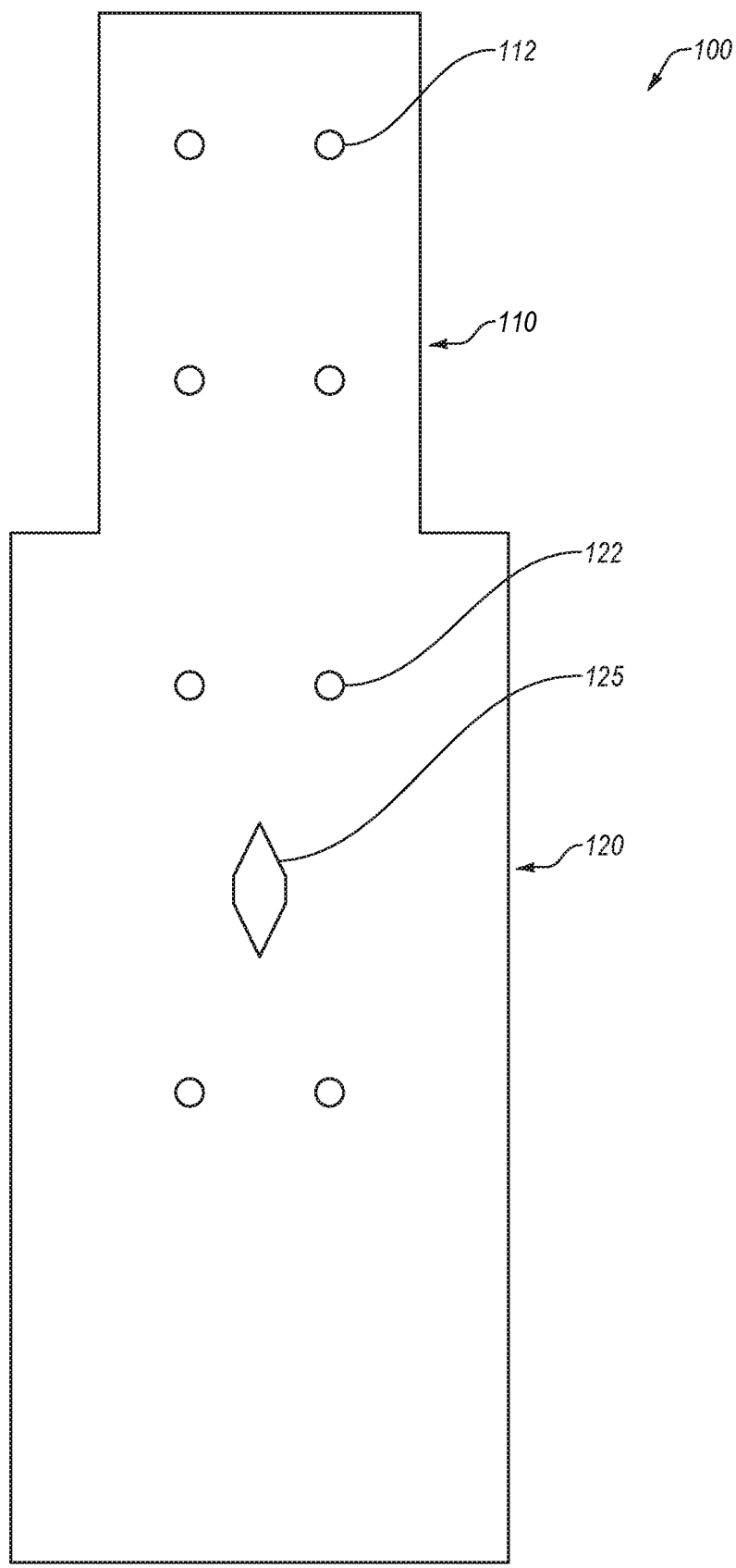
FIG. 1 is a plan view of a tab for hanging an inflatable curtain airbag cushion/module according to some embodiments.

FIG. 1 depicts a tab 100 for coupling an airbag cushion and/or cushion module, such as in preferred embodiments and implementations an inflatable curtain airbag/module, according to some embodiments. As shown in this figure, tab 100 comprises a first section 110 and a second section 120. Sections 110 and 120 may have distinct dimensions and/or other physical characteristics. For example, in the depicted embodiment, section 110 is both shorter in length (measured along the elongated axis of the tab 100 between the top and bottom of the tab 100 from the perspective of FIG. 1) and width (measured from side to side from the perspective of FIG. 1 and perpendicular to the aforementioned length). The reasons for these distinct lengths will be apparent after reviewing this disclosure in its entirety. In the depicted embodiment, the border/edge between sections 110 and 120 comprises a step or ledge, as shown in FIG. 1. However, other embodiments are contemplated in which this is not the case. For example, these sections may be delineated by one or more tapering edges, as shown in the tab 400 of FIG. 4. In still other embodiments, there may not be any distinguishable feature to define two or more distinct sections.

Section 110 comprises a plurality of openings 112. Similarly, section 120 comprises a plurality of openings 122 as well. As discussed in greater detail below, tab 100 is configured to be folded, preferably multiple times, to align one or more of these openings with one another prior to completing a step of attaching the tab 100 to a hanger, which hanger may be used to mount or otherwise couple an airbag cushion and/or cushion module within a vehicle. In preferred embodiments and implementations, this attaching step may comprise sewing/stitching the folded tab assembly to a portion of the cushion/module.

Section 120 further comprises a slot 125 configured to receive a portion of a hanger or another suitable coupling device. As shown in FIG. 1, slot 125 is positioned in between two sets of openings 122. More particularly, in the depicted embodiment, slot 125 is centered in between two opposing pairs of openings 122 and is preferably elongated to allow for receipt of a protruding portion of a hanger, such as head 52 of hanger 50 shown in FIG. 2A.

Figure 2A:
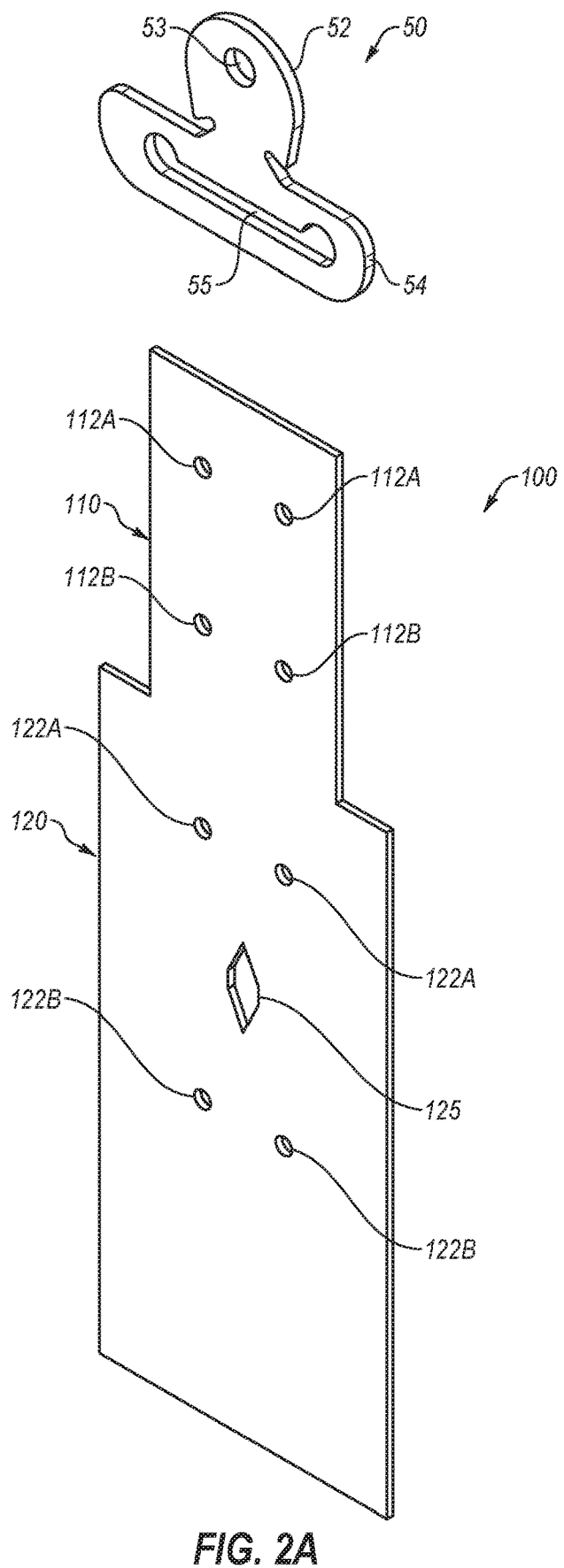
FIG. 2A is a perspective view of the tab of FIG. 1 along with a hanger configured to be coupled with the tab.

As shown in FIG. 2A, hanger 50 comprises head 52, which may comprise an opening 53 configured to receive a fastener that may be used to mount or otherwise couple hanger 50 to a vehicle. Hanger 50 further comprises an elongated hanger slot 55, which may be formed in a widened base portion 54 of hanger 50. FIG. 2A further differentiates the various openings 112/122 of sections 110 and 120, respectively. In particular, section 110 comprises four openings, namely, a first pair of openings 112A and a second pair of openings 112B. As described below, respective openings 112A are configured to be aligned with respective openings 112B during an assembly/folding process.

Similarly, section 120 comprises a first pair of openings 122A and a second pair of openings 122B. Respective openings 122A are also configured to be aligned with respective openings 122B during the aforementioned assembly/folding process. In addition, ultimately each of the four openings extending along the right side of the tab 100 (from the perspective of FIG. 2A) is aligned in a double-folded assembly and, similarly, each of the four openings extending along the left side of the tab 100 is also aligned in a double-folded assembly.

Figure 2B:
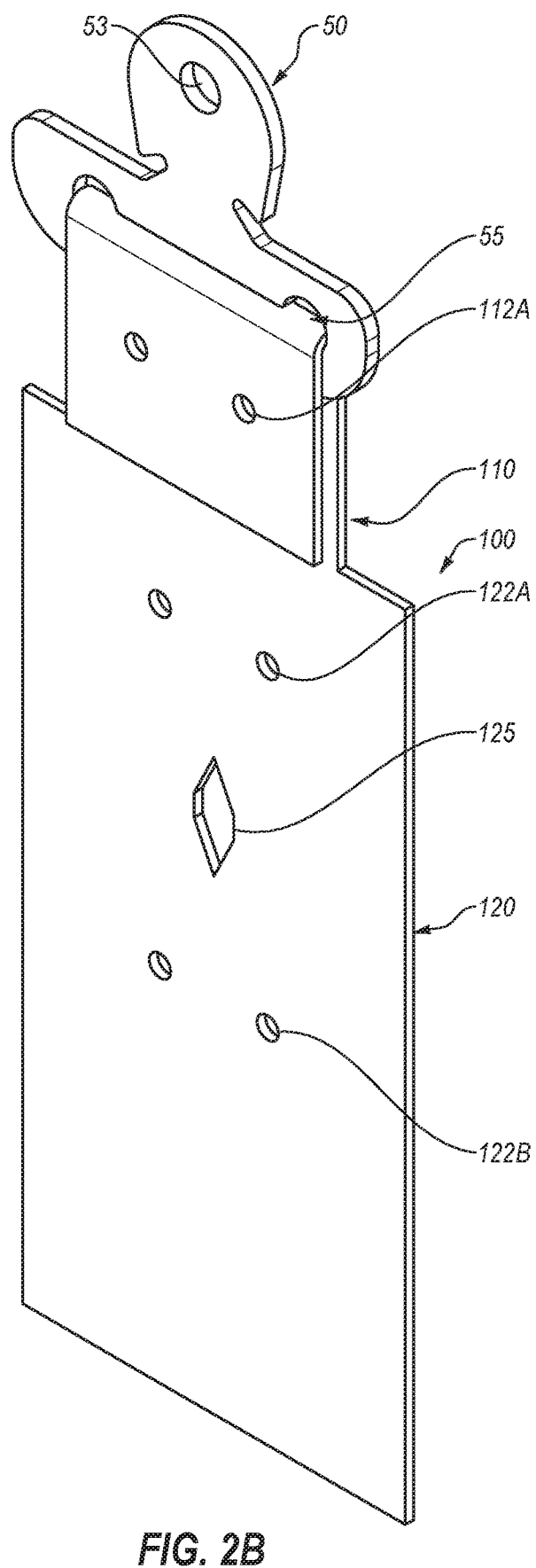
FIGS. 2B-2E depict various steps in a method for coupling the tab with the hanger.

FIGS. 2B-2E depict various steps in a method for coupling tab 100 with hanger 50. Thus, as shown in FIG. 2B, initially section 110 of tab 100 is extending through elongated hanger slot 55 and folded against itself, preferably to align openings 112A with openings 112B.

Figure 2C:
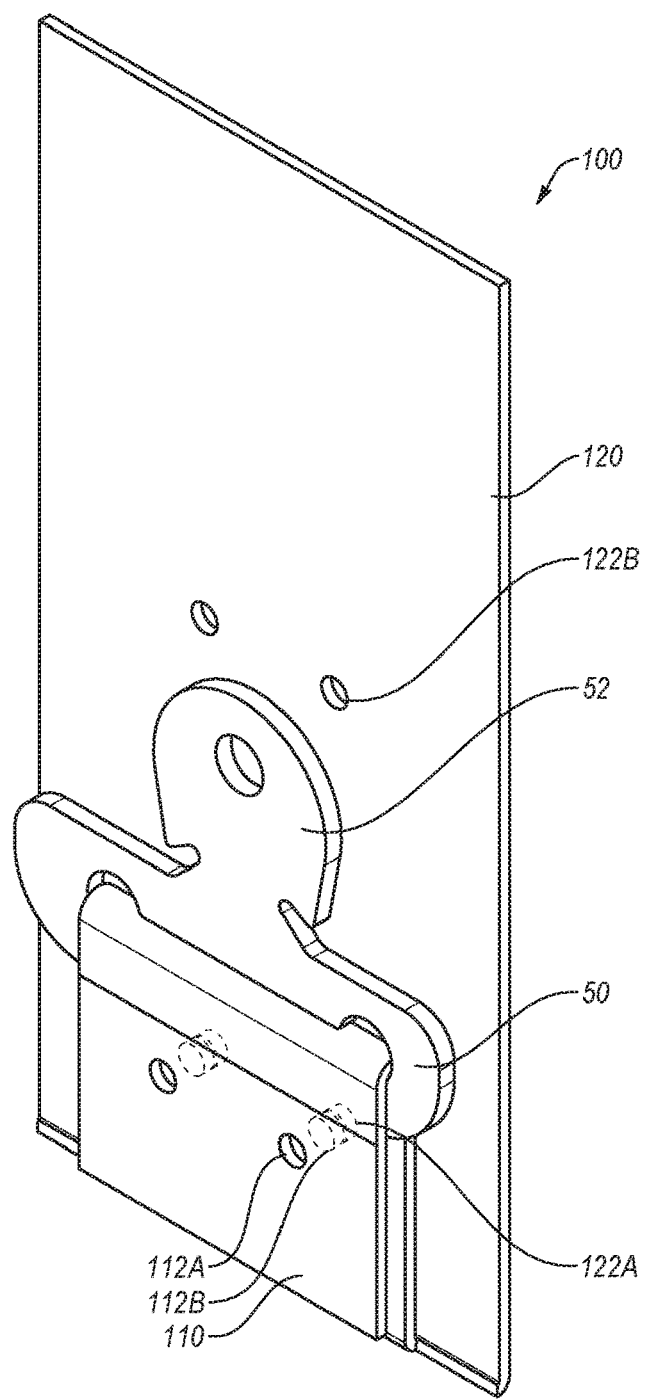

As shown in FIG. 2C, tab 100 may then be folded again, preferably in the opposite direction as the first fold. In the depicted implementation, this fold may be done to further align the previously aligned openings (openings 112A and 112B) with the top row of openings 122A in section 120, thereby aligning two sets of three openings together. In some embodiments, including the depicted embodiment, this second fold may take place at, or at least substantially at, the border between sections 110 and 120, as shown in FIG. 2C.

Figure 2D:
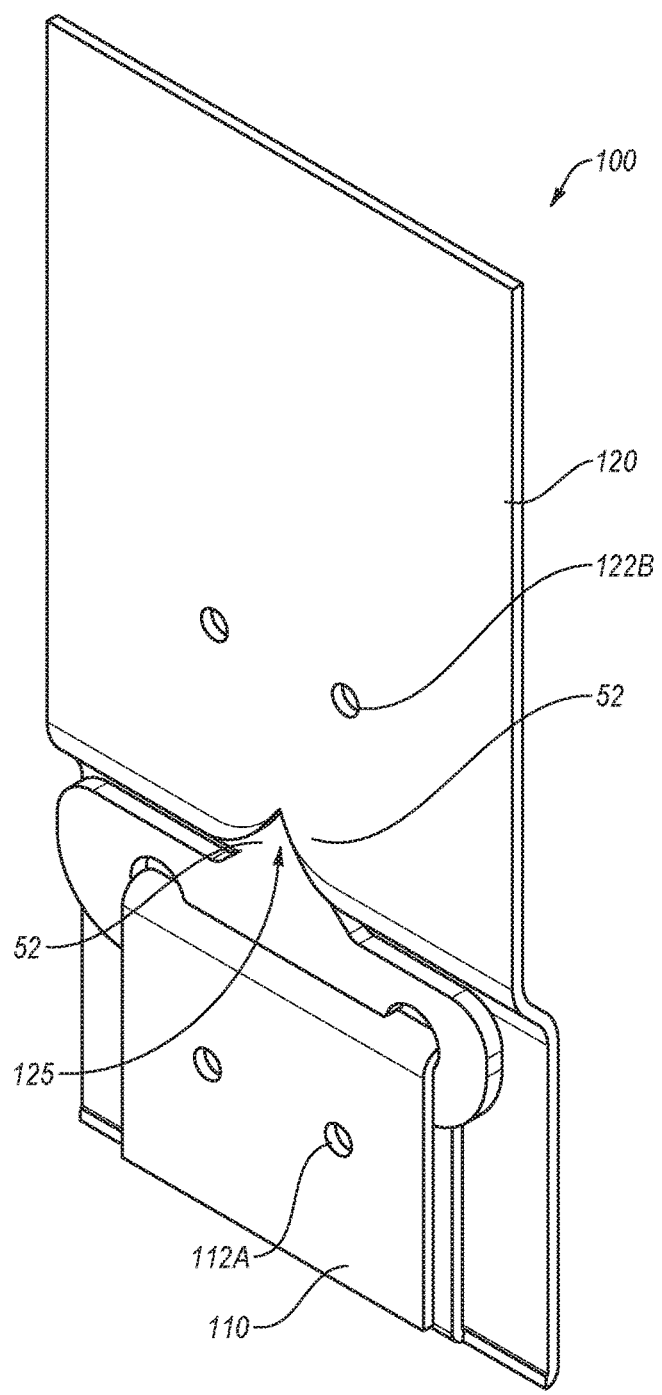
Figure 2E:
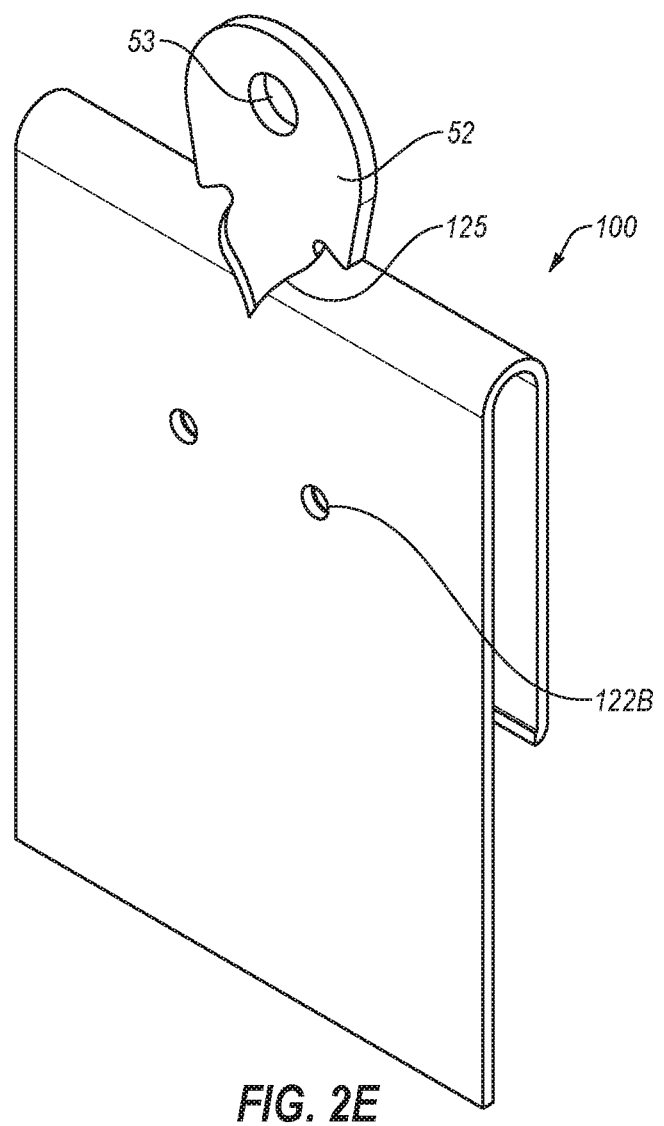

The head 52 of hanger 50 may then be inserted through slot 125, as illustrated in FIG. 2D, after which tab 100 may be folded about the elongated base 54 of hanger 50, as shown in FIG. 2E. Preferably tab 100 is configured with spacing between the various openings/slots such that this fold results in openings 122B being aligned with the aforementioned other three openings of tab 100. Thus, at the stage depicted in FIG. 2D, two sets of four openings are aligned with one another. This ensures a correct length ratio and proper alignment of the various features to provide for a consistent coupling between tab 100, hanger 50, and an airbag cushion and/or module.

Figure 2F:
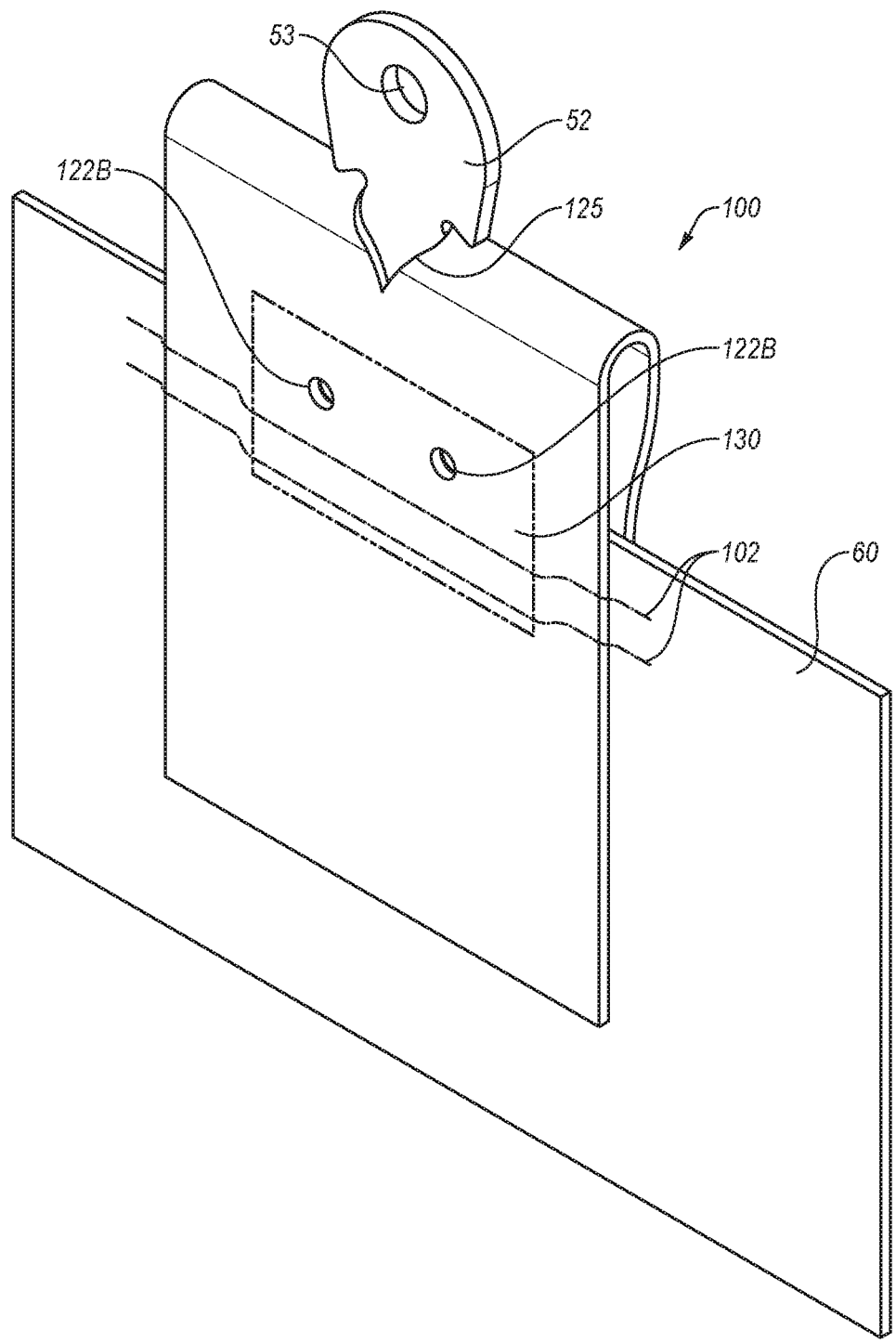
FIG. 2F depicts the combined tab and hanger assembly being coupled with an airbag cushion.

FIG. 2F depicts the results of a subsequent coupling step in which tab 100 is sewn, stitched, or otherwise coupled with a portion of an airbag module, such as fabric 60, which may be part of the airbag cushion itself or may be another material that is part of an inflatable curtain airbag cushion module or another airbag cushion module. In the depicted example, two parallel sewn lines 102 are used, one or both of which may extend through fabric 60 and multiple layers of tab 100.

It should also be understood that, in the depicted embodiment part of assembled/coupled tab 100 comprises four layers and another part comprises only two layers. More particularly, region 130, which is defined by two inner layers of section 110 and two outer layers of section 120, comprises four layers and the remainder of, or at least another part of, tab 100 comprises only two layers. Because, in the depicted embodiments, the portions of folded/assembly tab 100 on both opposing sides of region 130 comprises only two layers, a "ramping" effect may be provided during the sewing operation. In particular, because region 130 comprises four layers and the edges of the folded/assembled tab 100 comprise only two layers, the initial stitching may begin along the two-layered portion and the transition to the four-layered section, which may otherwise be difficult, is facilitated by providing a transitional, lesser step into the four-layered region 130. This feature and/or the alignment of two or more holes, as previously mentioned, may serve as a poka-yoke feature to ensure consistency and prevent errors during assembly/manufacturing.

Element 60, which may but need not in all embodiments comprise a cushion or other fabric layer, may be positioned in between outer layers of tab 100, as shown in FIG. 2F. Alternatively, folded/assembly tab 100 may be positioned and sewn or otherwise coupled with layer/element 60 on only one side thereof.

Figure 3:
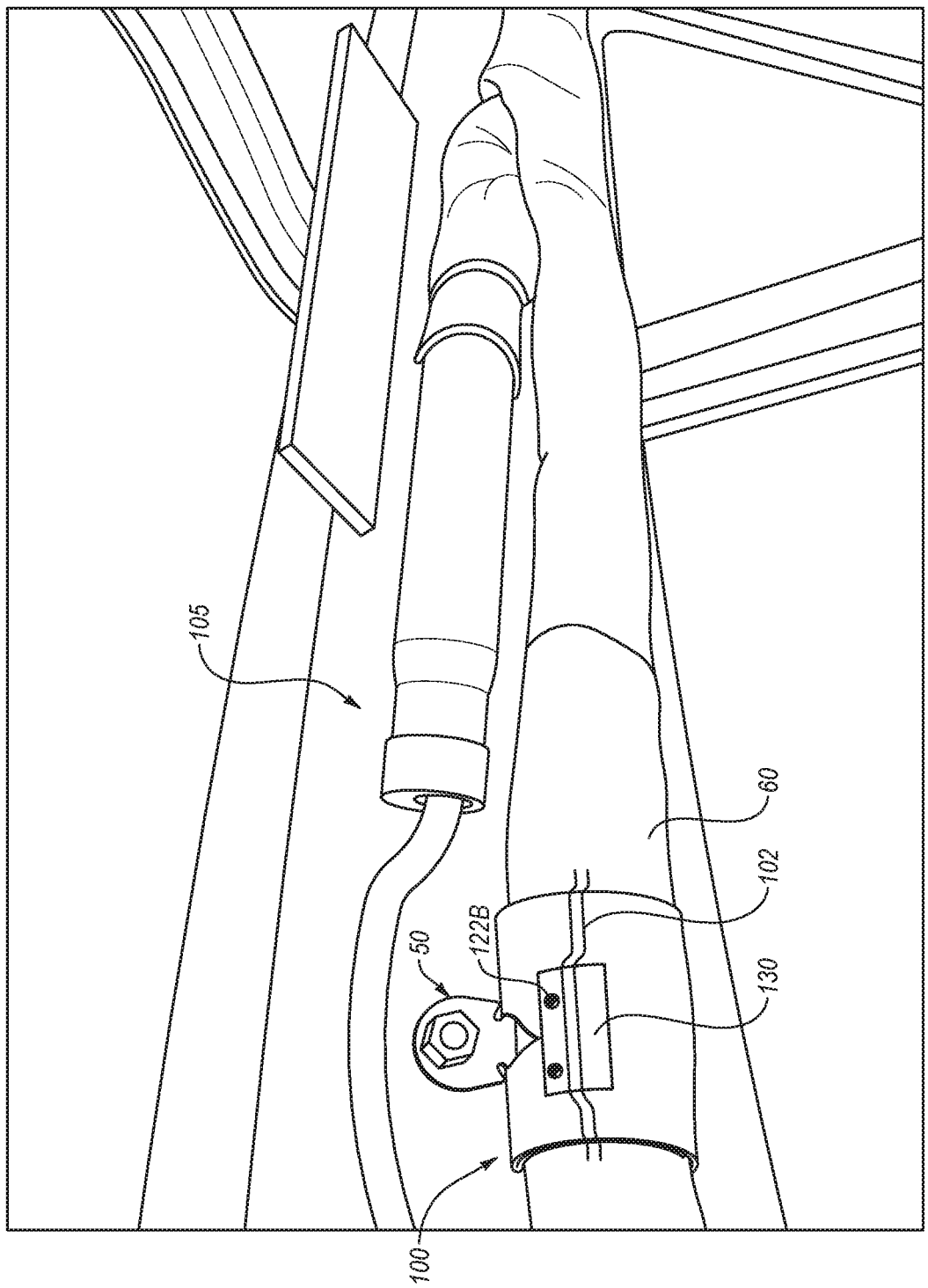
FIG. 3 is a perspective view of an inflatable airbag cushion mounted to a vehicle using the tab and hanger of FIGS. 2A-2E.

FIG. 3 illustrates a full airbag assembly 105, which in the depicted embodiment comprises an inflatable curtain airbag assembly. As shown in this figure, tab 100 is sewn with cushion 60 of assembly 105 and hanger 50 is used to mount the assembly 105 to a vehicle by extending a bolt or other faster through the opening in the head of hanger 50.

Thus, in some implementations of methods for coupling a tab with a hanger for mounting an airbag cushion module, the method may comprise extending a first section of the tab through a slot formed in the hanger, folding a first portion of the first section of the tab against a second portion of the first section of the tab to form a folded region, inserting a portion of the hanger through a tab slot formed in a second section of the tab, and folding at least a portion of the second section of the tab against the folded region to add at least one additional layer to the folded region (in some preferred methods, two additional layers such that the folded region comprises four layers).

In some such methods, following the step of folding at least a portion of the second section of the tab against the folded region, the tab may comprise at least a portion comprising four layers and a portion comprising two layers.

In some preferred methods, the first section of the tab comprises a plurality of openings, and at least two openings of the first plurality of openings may be aligned during the folding process. In some cases, two or more sets of openings may be aligned, such as aligning two sets of four openings each as shown in the aforementioned figures.

Figure 4:
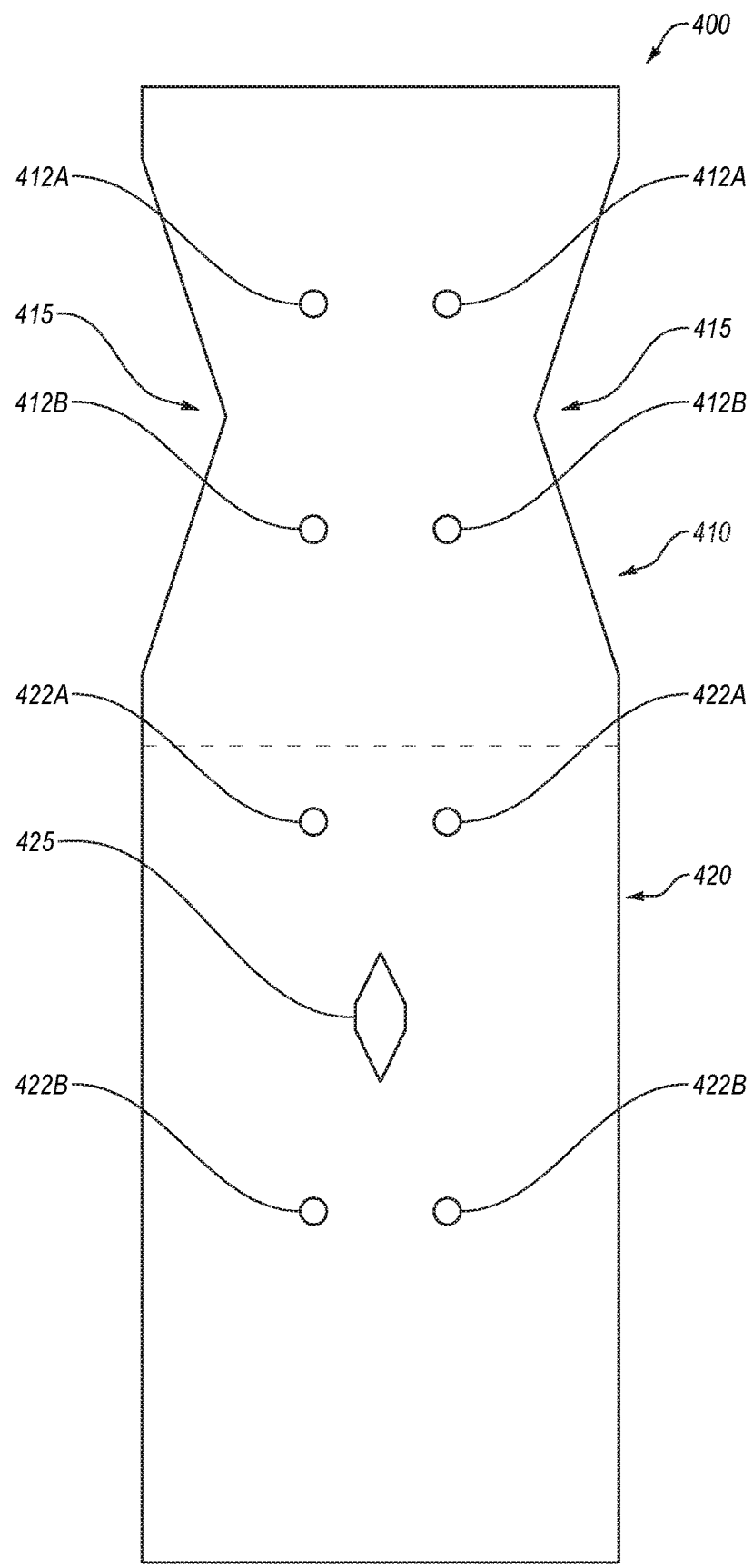
FIG. 4 is a plan view of another tab for hanging an inflatable curtain airbag cushion/module according to other embodiments.

FIG. 4 depicts an example of an alternative tab 400 according to some embodiments. Like tab 100, tab 400 comprises two distinct sections, namely section 410 and section 420. Again, each section comprises four alignable openings and section 420 comprises a slot 425 configured for receipt of a head of a hanger, as previously mentioned. Thus, openings 412A are configured to be foldably aligned with openings 412B and openings 422A are configured to be foldably aligned with openings 422B. However, as those of ordinary skill in the art will appreciate, alternative numbers of alignable openings may be used, both in connection with tab 100 and tab 400. As with tab 100, tab 400 may also be folded multiple times, preferably in opposing directions, to align each of the openings 412/422 on the left side and each of those on the right side such that two sets of four openings are aligned.

Figure 5:
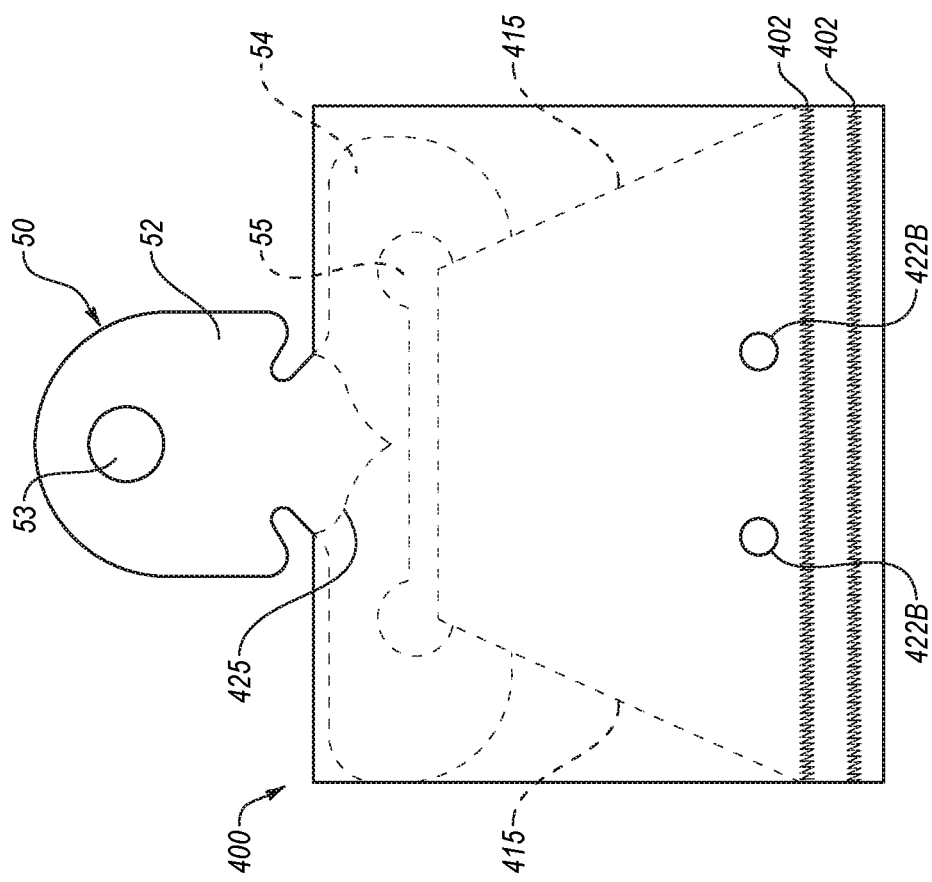
FIG. 5 depicts an assembly comprising the tab of FIG. 4 foldably coupled with a hanger.

However, unlike tab 100, tab 400 comprises two opposing cutouts 415, which may be defined by providing two angles cuts in the opposing edges of section 410. These cutouts 415 may allow tab 400 to extend through a slot 55 of a tab 50, as shown in FIG. 5. Thus, the narrowest portion of section 410 may comprise a width that is less than the length of slot 55. In some embodiments, the narrowest portion of section 410 may comprise a width that is the same, or at least substantially the same, as the length of slot 55, as also shown in FIG. 5.

Once again, preferably at least a portion of the folded/assembled tab 400 comprises four layers and one or more (two in the depicted embodiment) sets of openings through two or more layers are aligned. Thus, in the depicted embodiment, both of exterior openings 422B are aligned with openings 422A, 412A, and 412B underneath. Again, this may vary in other contemplated embodiments.

Figure 6:
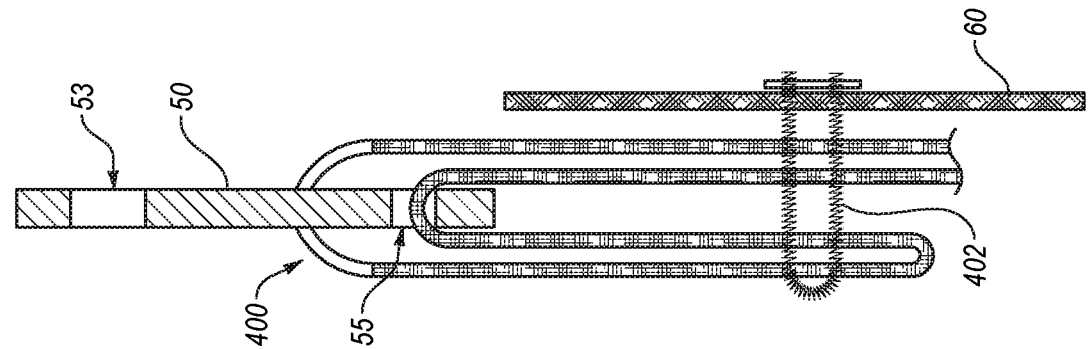
FIG. 6 is a cross-sectional view of the assembly of FIG. 5.

In addition, one or more stitches 402 may be used to couple tab 400 to a fabric layer or other element of an airbag module. Although in the embodiment depicted in FIG. 5 these sew lines 402 extend through four layers of the tab 400, in some embodiments they may begin higher, such as above openings 422B, to provide the ramping benefit previously mentioned. FIG. 6 illustrates how these four layers of tab 400 are coupled with layer 60, which, again, may comprise a part of an inflatable curtain or other airbag cushion, and further illustrate the plurality of folds used to couple tab 400 with hanger 50. As previously mentioned, an opening 53 may be provided in hanger 50 to facilitate mounting of the cushion module to a vehicle.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   a curtain airbag module;
   a hanger configured to mount the curtain airbag module within a vehicle, wherein the hanger comprises a head and a hanger slot, and wherein the head protrudes from an elongated body of the hanger defining the hanger slot; and
   a tab coupled to the hanger and the curtain airbag module, wherein the tab comprises a tab slot for receiving the head of the hanger therethrough, and wherein the tab is coupled to the hanger with the head of the hanger extending through the tab slot and with at least a portion of the tab extending through the hanger slot such that at least a portion of the tab defining the tab slot engages the elongated body adjacent to the head, wherein the tab comprises a plurality of openings, wherein at least two openings of the plurality of openings are aligned, wherein the tab comprises at least a portion having at least four layers, and wherein the tab comprises a first portion having four layers and a second portion having two layers.

2. The airbag cushion assembly of claim 1, wherein each of the at least four layers comprises at least one opening aligned with an opening in each other layer of the at least four layers.

3. The airbag cushion assembly of claim 1, further comprising a stitch extending through the first portion, the second portion, and at least a portion of the curtain airbag module.

4. The airbag cushion assembly of claim 1, wherein the tab comprises a first section and a second section, and wherein the second section comprises, at least in part, a narrower width than the first section.

5. The airbag cushion assembly of claim 4, wherein the width of the second section is less than a length of the hanger slot, and wherein the width of the first section is greater than the length of the hanger slot.

6. A tab for coupling an airbag cushion to a hanger, the tab comprising:
   a first section comprising a first plurality of openings and a slot configured to receive a portion of the hanger therethrough, the slot being positioned in between at least a first opening of the first plurality of openings and a second opening of the first plurality of openings; and
   a second section comprising a second plurality of openings, wherein the second section comprises, at least in part, a narrower width than the first section.

7. The tab of claim 6, wherein the tab is configured to be coupled with the hanger by inserting the portion of the hanger through the slot, aligning at least two openings of the first plurality of openings, and aligning at least one opening of the second plurality of openings with the at least two openings of the first plurality of openings.

8. The tab of claim 7, wherein the first section comprises four openings, wherein a first pair of the four openings are configured to be aligned and a second pair of the four openings are configured to be aligned by folding a portion of the first section against another portion of the first section, wherein the second section comprises four openings, and wherein the tab is configured such that, by folding the second section against the first section, a first pair of the four openings of the second section is configured to be aligned with the first pair of the four openings of the first section and a second pair of the four openings of the second section is configured to be aligned with the second pair of the four openings of the first section.

9. The tab of claim 6, wherein the second section comprises a pair of opposing cutouts.

10. The tab of claim 6, wherein the second section comprises opposing edges defining the width of the second section therebetween, and wherein the opposing edges are at least substantially parallel.

11. The tab of claim 6, wherein the first section comprises a length greater, at least in part, than a length of the second section.

12. The tab of claim 7, wherein the slot comprises an elongated slot, and wherein each of the openings of the first plurality of openings and the second plurality of openings comprises a circular hole.

13. A method for coupling a tab with a hanger for mounting an airbag cushion module, the method comprising the steps of:
- extending a first section of the tab through a slot formed in the hanger;
- folding a first portion of the first section of the tab against a second portion of the first section of the tab to form a folded region;
- inserting a portion of the hanger through a tab slot formed in a second section of the tab; and
- folding at least a portion of the second section of the tab against the folded region to add at least one additional layer to the folded region.

14. The method of claim 13, wherein the step of folding at least a portion of the second section of the tab against the folded region adds two additional layers to the folded region such that the folded region comprises four layers.

15. The method of claim 14, wherein, following the step of folding at least a portion of the second section of the tab against the folded region, the tab comprises at least a portion comprising four layers and a portion comprising two layers.

16. The method of claim 13, further comprising sewing the tab to a portion of the airbag cushion module.

17. The method of claim 13, wherein the first section of the tab comprises a plurality of openings, and further comprising aligning at least two openings of the first plurality of openings.

* * * * *